United States Patent
Prochnow et al.

(10) Patent No.: US 12,007,518 B2
(45) Date of Patent: Jun. 11, 2024

(54) SYSTEMS AND METHODS FOR IDENTIFYING TYPE CURVE REGIONS AS A FUNCTION OF POSITION IN A REGION OF INTEREST

(71) Applicant: CHEVRON U.S.A. INC., San Ramon, CA (US)

(72) Inventors: Shane James Prochnow, Fredericksburg, TX (US); Benjamin Rodolphe Cormier, San Francisco, CA (US); Vahid Tohidi, Calgary (CA); Michelle Wan, Calgary (CA)

(73) Assignee: CHEVRON U.S.A. INC., San Ramon, CA (US)

( * ) Notice: Subject to any disclaimer, the term of this patent is extended or adjusted under 35 U.S.C. 154(b) by 66 days.

(21) Appl. No.: 17/562,629

(22) Filed: Dec. 27, 2021

(65) Prior Publication Data
US 2023/0204815 A1    Jun. 29, 2023

(51) Int. Cl.
*G01V 20/00* (2024.01)
*G01V 11/00* (2006.01)
*G06N 20/20* (2019.01)

(52) U.S. Cl.
CPC ............ *G01V 20/00* (2024.01); *G01V 11/002* (2013.01); *G06N 20/20* (2019.01)

(58) Field of Classification Search
None
See application file for complete search history.

(56) References Cited

U.S. PATENT DOCUMENTS

| | | | |
|---|---|---|---|
| 6,574,565 B1 | 6/2003 | Bush | |
| 2006/0092766 A1* | 5/2006 | Shelley | G01V 11/00 367/72 |
| 2019/0065577 A1 | 2/2019 | Tylenda | |
| 2019/0094414 A1 | 3/2019 | Prochnow et al. | |

(Continued)

FOREIGN PATENT DOCUMENTS

| | | | |
|---|---|---|---|
| CN | 111045106 A | 4/2020 | |
| CN | 112049619 A | 12/2020 | |

(Continued)

OTHER PUBLICATIONS

Alexander Bakay; Jef Caers; Tapan Mukerji; Patrick Miller; Cheryl Cartier; Arnulfo Briceno; Machine Learning of Spatially Varying Decline Curves for the Duvernay Formation; Paper presented at the SPE Annual Technical Conference and Exhibition, Calgary, Alberta, Canada, Sep. 2019 (Year: 2019).*

(Continued)

*Primary Examiner* — Lina Cordero
(74) *Attorney, Agent, or Firm* — Sheppard, Mullin, Richter & Hampton LLP

(57) ABSTRACT

Methods, systems, and non-transitory computer readable media for identifying type curve regions as a function of position in a region of interest are disclosed. Exemplary implementations may include: obtaining a spatial clustering model from the non-transitory storage medium; obtaining well data from the non-transitory storage medium; obtaining production parameter data from the non-transitory storage medium; and delineating each of the type curve regions in the region of interest by applying the spatial clustering model to the well data and the production parameter data.

18 Claims, 7 Drawing Sheets

(56) References Cited

U.S. PATENT DOCUMENTS

| | | | |
|---|---|---|---|
| 2020/0097864 A1* | 3/2020 | Gupta | G06Q 50/06 |
| 2021/0279376 A1* | 9/2021 | Langenborg | E21B 41/00 |
| 2022/0114302 A1* | 4/2022 | Skripkin | G06N 20/20 |

FOREIGN PATENT DOCUMENTS

| | | |
|---|---|---|
| CN | 112727452 A | 4/2021 |
| WO | WO 2000/016126 A1 | 3/2000 |
| WO | WO 2015/137943 A1 | 9/2015 |

OTHER PUBLICATIONS

Dudek, A. (2020). Silhouette Index as Clustering Evaluation Tool. In: Jajuga, K., Batóg, J., Walesiak, M. (eds) Classification and Data Analysis. SKAD 2019. Studies in Classification, Data Analysis, and Knowledge Organization. Springer, Cham. https://doi.org/10.1007/978-3-030-52348-0_2 (Year: 2020).*

Caliński et al., "A dendrite method for cluster analysis," Communications in Statistics—Theory and Methods, 3:1, 1-27 (1974), 25 pages.

Davies et al., "A Cluster Separation Measure", IEEE Transactions on Pattern Analysis and Machine Intelligence, vol. pami-1,No. 2, Apr. 1979, 4 pages.

Dunn, J.C., "A Fuzzy Relative of the ISODATA Process and Its Use in Detecting Compact Well-Separated Clusters", Journal of Cybernetics, vol. 3, Issue 3, 1974, pp. 32-57, http://www.tandfonline.com/doi/abs/10.1080/01969727308546046 Last accessed May 11, 2017, 26 pages.

Ester et al., "A density-based algorithm for discovering clusters in large spatial databases with noise," Proceedings of the Second International Conference on Knowledge Discovery and Data Mining (KDD-96). AAAI Press. pp. 226-231. CiteSeerX10.1.1.121.9220.(1996) ISBN 1-57735-004-9, 6 pages.

Gudmundsson et al., "Computing Longest Duration Flocks in Trajectory Data", ACM-GIS'06, Nov. 10-11, 2016. Arlington, VA, 8 pages.

Kisilevich et al., "Spatio-Temporal Clustering: a Survey", Technical Report, ISTI-CNR, Italy. Submitted to Data Mining and Knowledge Discovery Handbook, Springer, 2010, 22 pages.

Maulik et al., "Performance Evaluation of Some Clustering Algorithms and Validity Indices", IEEE Transactions on Pattern Analysis and Machine Intelligence, vol. 24, No. 12, Dec. 2002, 5 pages.

Pravilovic et al., "Application of Spatio-Temporal Clustering in Forecasting Optimization of Geo-Referenced Time Series",American Journal of Modeling and Optimization, 2014. vol. 2, No. 1, 8-15. Science and Education Publishing, DOI:10.12691/ajmo-2-1-2, 8 pages.

Rand, William M., "Objective Criteria for the Evaluation of Clustering Methods", Journal of the American Statistical Association, vol. 66,No. 336. Dec. 1971, 5 pages.

Van Rijsbergen, C.J., "Information Retrieval", 2nd Edition, Department of Computing Science, University of Glasgow, 1979, 153 pages.

Vieira et al., "On-line Discovery of Flock Patterns in Spatio-Temporal Data", Proceedings of the 17th ACM SIGSPATIAL International Conference of Advances in Geographic Information Systems, 2009, 18 pages.

Wang et al., "DBRS: A Density-Based Spatial Clustering Method with Random Sampling," Advances in Knowledge Discovery and Data Mining. PAKDD 2003. Lecture Notes in Computer Science, vol. 2637. Springer, Berlin, Heidelberg. https://doi.org/10.1007/3-540-36175-8_56, 26 pages.

Yang et al., "Temporal Data Clustering Via Weighted Clustering Ensemble with Different Representations", IEEE Transactionson Knowledge and Data Engineering, vol. 23 No. 2, Feb. 2011, 13 pages.

Yasodha et al., "A Survey on Temporal Data Clustering", International Journal of Advanced Research in Computer and Communication Engineering, vol. 1, Issue 9, Nov. 2012, 5 pages.

Crnkovic-Friis et al., "SPE-174799-MS Geology Driven EUR Prediction Using Deep Learning," XP093040062, Sep. 28, 2015. Retrieved from the Internet: https://onepetro.org.

Li et al., "Rescaling Method for Improved Machine-Learning Decline Curve Analysis for Unconventional Reservoirs," vol. 26, No. 04, XP093040300, ISSN: 1086-055X, DOI: 10.2118/208349-PA. Retrieved from the Internet: http://onepetro.org/SJ/article-pdf/26/04/1759/2474726/spe-205349-pa.pdf.

Prochnow et al., "A Subsurface Machine Learning Approach at Hydrocarbon Production Recovery & Resource Estimates for Unconventional Reservoir Systems: Making Subsurface Predictions from Multimensional Data Analysis," SSRN Electronic Journal, Jan. 1, 2022, DOI: 10.2139/ssrn.4054101. Retrieved from the Internet: http://dx.doi.org/10.2139/ssrn.4054101.

Extended European Search Report dated Apr. 28, 2023 for European Application No. 22214830.6.

Examination Report—Communication pursuant to Article 94(3) EPC for European Application No. 22214830.6.

* cited by examiner

SYSTEMS AND METHODS FOR IDENTIFYING TYPE CURVE REGIONS AS A FUNCTION OF POSITION IN A REGION OF INTEREST

FIELD OF THE DISCLOSURE

The present disclosure relates to systems and methods for identifying type curve regions as a function of position in a region of interest.

SUMMARY

Implementations of the disclosure are directed to systems and methods for identifying type curve regions as a function of position in a region of interest. An aspect of the present disclosure relates to a computer-implemented method for identifying type curve regions as a function of position in a region of interest. The method may be implemented in a computer system that comprises a physical computer processor and non-transitory storage medium. The method may include a number of steps. One step may include obtaining a spatial clustering model from the non-transitory storage medium. Another step may include obtaining well data from the non-transitory storage medium. The well data may include well locations in the region of interest and corresponding productivity for the well locations. Yet another step may include obtaining production parameter data from the non-transitory storage medium. The production parameter data may include production parameter values characterizing subsurface production features that affect reservoir productivity in the region of interest. Another step may include delineating, with the physical computer processor, each of the type curve regions in the region of interest by applying the spatial clustering model to the well data and the production parameter data. The type curve regions may be delineated based on at least differences in different types of productivity values.

In implementations, the computer system may include a display. The computer-implemented method may include another step: generating, with the physical computer processor, a representation of the type curve regions as a function of position in the region of interest using visual effects to depict geographic boundaries outlining at least some of the type curve regions delineated using the spatial clustering model. Yet another step may include displaying the representation via the display.

In implementations, the spatial clustering model may be based on at least a ratio between a mean productivity variation between areas in the region of interest and a productivity variation within one of the areas in the region of interest.

In implementations, the spatial clustering model may include an unsupervised machine learning model. The unsupervised machine learning model may include adjustable hyperparameters.

In implementations, the adjustable hyperparameters may include reservoir original oil in place, porosity, geomechanics, pressure, temperature, position, reservoir thickness, and/or a number of type curve regions.

In implementations, the production parameters may include average porosity, pore saturation, mineralogy, lithofacies, geomechanical properties, organic richness, pore pressure, quartz normalized, volume water, argillic bed count, bed thickness, gross thickness, gross perforation length, fracture fluid intensity, proppant intensity, and/or productivity.

In implementations, the different types of productivity values may include mean productivity values and/or P10-P90 values.

An aspect of the present disclosure relates to a system identifying type curve regions as a function of position in a region of interest. The system may include non-transitory storage medium. The system may also include a physical computer processor configured by machine readable instructions to perform a number of steps. One step may include obtaining a spatial clustering model from the non-transitory storage medium. Another step may include obtaining well data from the non-transitory storage medium. The well data may include well locations in the region of interest and corresponding productivity for the well locations. Yet another step may include obtaining production parameter data from the non-transitory storage medium. The production parameter data may include production parameter values characterizing subsurface production features that affect reservoir productivity in the region of interest. Another step may include delineating, with the physical computer processor, each of the type curve regions in the region of interest by applying the spatial clustering model to the well data and the production parameter data. The type curve regions may be delineated based on at least differences in different types of productivity values.

In implementations, the system may further include a display. Another step may include generating, with the physical computer processor, a representation of the type curve regions as a function of position in the region of interest using visual effects to depict geographic boundaries outlining at least some of the type curve regions delineated using the spatial clustering model. Yet another step may include displaying the representation via the display.

In implementations, the spatial clustering model may be based on at least a ratio between a mean productivity variation between areas in the region of interest and a productivity variation within one of the areas in the region of interest.

In implementations, the spatial clustering model may include an unsupervised machine learning model. The unsupervised machine learning model may include adjustable hyperparameters.

In implementations, the adjustable hyperparameters may include reservoir original oil in place, porosity, geomechanics, pressure, temperature, position, reservoir thickness, and/or a number of type curve regions.

In implementations, the production parameters may include average porosity, pore saturation, mineralogy, lithofacies, geomechanical properties, organic richness, pore pressure, quartz normalized, volume water, argillic bed count, bed thickness, gross thickness, gross perforation length, fracture fluid intensity, proppant intensity, and/or productivity.

In implementations, the different types of productivity values may include mean productivity values and/or P10-P90 values.

An aspect of the present disclosure relates to a non-transitory computer-readable medium storing instructions for identifying type curve regions as a function of position in a region of interest. The instruction may be configured to, when executed, perform a number of steps. One step may include obtaining a spatial clustering model from a non-transitory storage medium. Another step may include obtaining well data from the non-transitory storage medium. The well data may include well locations in the region of interest and corresponding productivity for the well locations. Yet another step may include obtaining production parameter data from the non-transitory storage medium. The production parameter data may include production parameter values characterizing subsurface production features that affect reservoir productivity in the region of interest. Another step may include delineating, with the physical computer processor, each of the type curve regions in the region of interest by applying the spatial clustering model to the well data and the production parameter data. The type curve regions may be delineated based on at least differences in different types of productivity values.

In implementations, another step may include generating, with the physical computer processor, a representation of the type curve regions as a function of position in the region of interest using visual effects to depict geographic boundaries outlining at least some of the type curve regions delineated using the spatial clustering model. Yet another step may include display the representation via the display.

In implementations, the spatial clustering model may be based on at least a ratio between a mean productivity variation between areas in the region of interest and a productivity variation within one of the areas in the region of interest.

In implementations, the spatial clustering model may include an unsupervised machine learning model. The unsupervised machine learning model may include adjustable hyperparameters.

In implementations, the adjustable hyperparameters may include reservoir original oil in place, porosity, geomechanics, pressure, temperature, position, reservoir thickness, and/or a number of type curve regions.

In implementations, the production parameters may include average porosity, pore saturation, mineralogy, lithofacies, geomechanical properties, organic richness, pore pressure, quartz normalized, volume water, argillic bed count, bed thickness, gross thickness, gross perforation length, fracture fluid intensity, proppant intensity, and/or productivity.

These and other features, and characteristics of the present technology, as well as the methods of operation and functions of the related elements of structure and the combination of parts and economies of manufacture, will become more apparent upon consideration of the following description and the appended Claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the presently disclosed technology. As used in the specification and in the Claims, the singular form of "a", "an", and "the" include plural referents unless the context clearly dictates otherwise.

The technology disclosed herein, in accordance with one or more various implementations, is described in detail with reference to the following figures. The drawings are provided for purposes of illustration only and merely depict typical or example implementations of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
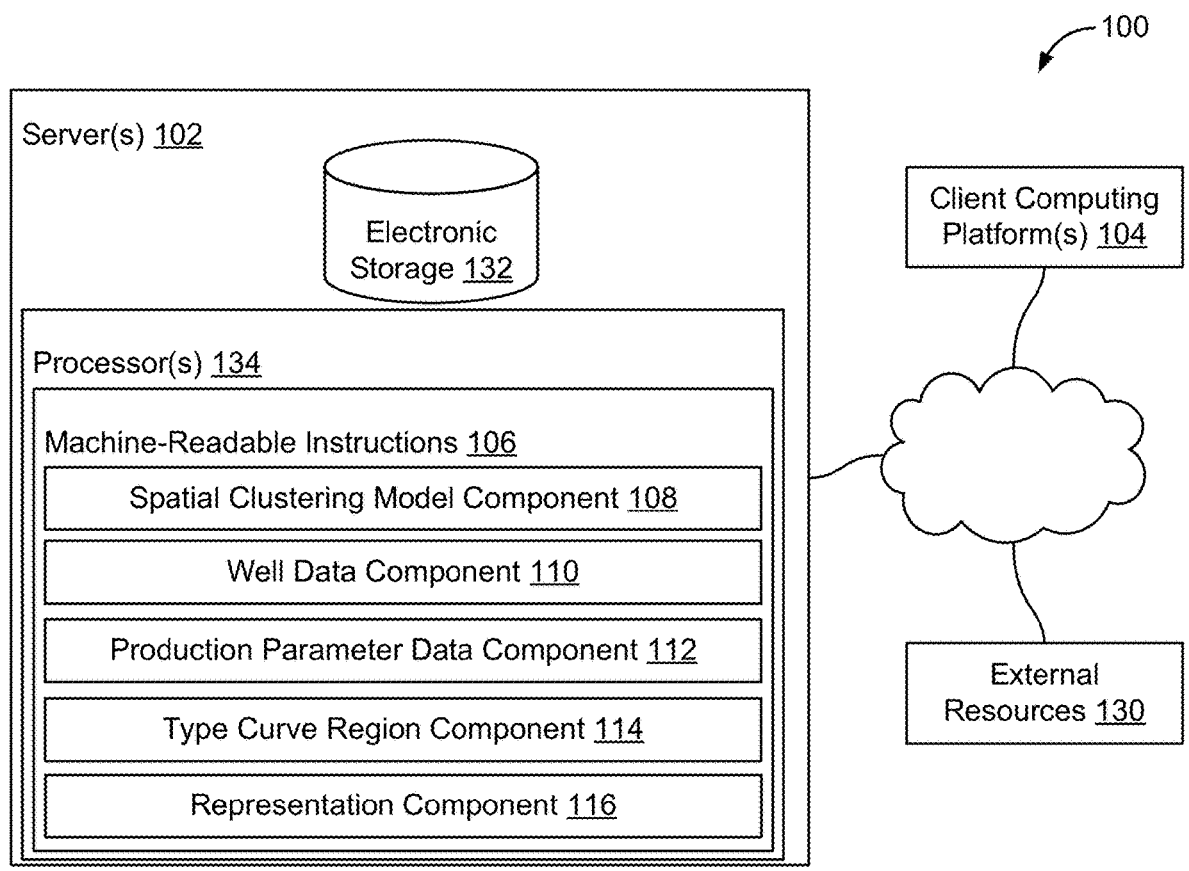
FIG. 1 shows a system configured for identifying type curve regions as a function of position in a region of interest, in accordance with one or more implementations.

Existing approaches used in production forecast of unconventional basins often rely on type production curves (type curves) from representative wells that are regarded to representatively characterize a distinct geographic area of a hydrocarbon producing region based on at least different productivities. These geographic regions are most often constructed subjectively and as a field matures with ongoing drilling campaigns with confused geographic boundary connections to subsurface reservoir transitions that are used to explain continuity in hydrocarbon production. These existing approaches often fail to account for natural clustering of relative well performance in geographic space due to the changing impact of key reservoir enablers. Moreover, existing methods do not account for normalizing production to engineering designs, nor do they mitigate the effect of clustering on well development. In addition, the subjective methods used to draw these types of type curve regions illustrated fail to account for reservoir properties for production or match the continuous, gradation reservoir changes to distinct polygonal type curve regions. The existing methods also do not test the statistical significance of regions against each other or fully appreciate when type curve regions should be subdivided or agglomerated. Nor do they make connections between production clustering and reservoir driver clustering. Accordingly, there exists a need for improved objective identification of type curve regions characterization that may allow predictions of the type curve generation.

The presently disclosed technology removes subjectivity from traditional type curve analysis by utilizing machine learned, continuous production forecasts to delineate type curve regions using spatial clustering that takes advantage of spatial proximity and predictor attribute similarity. Type curve regions may represent well production populations characterized by different mean production values and percentile description of the likely range of production outcomes within that region. Additionally, the presently disclosed technology is able to discover clusters that are arbitrarily shaped from samples that are unevenly dense across the region of interest. Moreover, the presently disclosed technology relates to clustering continuous and sample point data. The continuous data in this application may be a digital representation of forecasted hydrocarbon potential of a hydrocarbon producing basin, and the clusters may represent an optimal discretization of this formally continuous data into regions that are the most distinct from each other in terms of forecasted mean potential, but maintain minimal internal variation of hydrocarbon potential within their geographic boundaries. In some implementations, the presently disclosed technology may use a spatial clustering model on discrete geospatial well data with associated reservoir parameter data to identify type curve regions in the region of interest.

Disclosed below are methods, systems, and computer readable storage media that may provide identification of type curve regions as a function of position in a region of interest.

Reference will now be made in detail to various implementations, examples of which are illustrated in the accompanying drawings. In the following detailed description, numerous details may be set forth in order to provide a thorough understanding of the present disclosure and the implementations described herein. However, implementations described herein may be practiced without such details. In other instances, some methods, procedures, components, and mechanical apparatuses may not be described in detail, so as not to unnecessarily obscure aspects of the implementations.

The presently disclosed technology includes implementations of a method, system, and non-transitory computer-readable medium for identifying type curve regions as a function of position in the region of interest. The presently disclosed technology may be able to reduce the time to identify type curve regions and identify type curve regions that have greater distinction in mean production values while minimizing variation in P10-P90 values. The region of interest may include, or be bounded by, one or more of a water surface, a ground surface, and/or other surfaces. The presently disclosed technology may use well data and production parameter data to identify type curve regions as a function of position in the region of interest. A representation of the refined well designs as a function of position may be generated using visual effects. Type curve regions may geographically discretize continuously varying production trends that naturally occur in a hydrocarbon producing basin into a manageable system for the economic planning involved in drilling and production projects. Type curves may be the traditional methodology to predict the productivity of tight rock and unconventional plays that can be used to measure profitability of the hydrocarbon business activities.

FIG. 1 illustrates a system 100 configured for identifying type curve regions as a function of position in a region of interest, in accordance with one or more implementations. In some implementations, system 100 may include one or more servers 102. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Server(s) 102 may be configured by machine-readable instructions 106. Machine-readable instructions 106 may include one or more instruction components. The instruction components may include computer program components. The instruction components may include one or more of a spatial clustering model component 108, a well data component 110, a production parameter data component 112, a type curve region component 114, a representation component 116, and/or other instruction components.

Spatial clustering model component 108 may be configured to obtain a spatial clustering model. The spatial clustering model may be obtained from the non-transitory storage medium and/or other sources. In implementations, the spatial clustering model may be based on at least a ratio between a mean productivity variation between areas in the region of interest and a productivity variation within one of the areas in the region of interest. The spatial clustering model may be able to receive as input spatially discrete or spatially continuous values that can be used to delineate the type curve regions.

In implementations, the spatial clustering model may include an unsupervised machine learning model. The unsupervised machine learning model may include adjustable hyperparameters. In some implementations, the adjustable hyperparameters may include reservoir original oil in place, porosity, geomechanics, pressure, temperature, position, and/or reservoir thickness as examples of some adjustable hyperparameters, though it should be appreciated that there are other adjustable hyperparameters. It should also be appreciated that the adjustable hyperparameters may include only reservoir original oil in place, only porosity, only geomechanics, only pressure, only temperature, only position, only reservoir thickness, or any combination of these example adjustable hyperparameters (e.g., reservoir original oil in place and porosity, porosity and geomechanics, etc.; reservoir original oil in place, porosity, and geomechanics, porosity, geomechanics, and pressure, etc.; reservoir original oil in place, porosity, geomechanics, and pressure, porosity, geomechanics, pressure, and temperature, etc.; and so on). The number of the type curve regions in the region of interest is also adjustable, and the presently disclosed technology may use statistical methods to provide guidelines as to the number of type curve regions in the region of interest.

In implementations, there may be an initial spatial clustering model. The initial spatial clustering model may be obtained from the non-transitory storage medium and/or another source. The initial spatial clustering model may be based on at least machine learning techniques to map at least one variable to at least another variable. For example, the initial spatial clustering model may receive well data, production parameter data, subsurface data, and/or other data as input and output data. The subsurface data may include geological data. Geological data may include petrophysical, core, cutting, pressure, drilling property, mudlog, seismic properties, and/or other geological data. In implementations, for unconventional reservoirs, this may include an anticipated stimulated rock volume, a natural geologic target zone, or even a gross formation interval. Geological data may be gridded. Gridding methods, such as, for example, cokriging, may provide measurable uncertainty due to interpolation in the form of standard error maps. The standard error maps may be useful for considering the inclusion of a production parameter into a parameter model (e.g., random forest algorithm), as discussed in greater detail below. The initial spatial clustering model may be "untrained" or "unconditioned," indicating it may not estimate an output based on at least the input as accurately as a "trained" or "conditioned" model.

In some implementations, an initial spatial clustering model may be trained to generate the spatial clustering model. The initial spatial clustering model may include one or more components of a gradient boost regression, a random forest, a neural network, a regression, and/or other machine learning techniques. It should be appreciated that other spatial clustering models may include, for example, convolutional neural networks, reinforcement learning, transfer learning, and/or other machine learning techniques. The initial spatial clustering model may be trained using training data. The training data may include training well data, production parameter data, subsurface data, and/or other data, as will be described in greater detail below. The training data may be derived from seismic data, historic data, and/or other data. The seismic data may be collected from multiple seismic data sites/surveys (i.e., on a pad or regional scale) and correspond to different geophysical collection methods (i.e., 2D seismic, 3D seismic, multicomponent 3D seismic, time-lapse (4D) seismic, microseismic, VSP, and the like). In some implementations, determining productivity may be performed before spatial clustering to establish the link between production parameter data and/or other training data and well production. Once the relationship and relative impact of the training data (e.g., production parameters) is established, the data can be used to constrain the spatial delineation of resulting regions nearby or around a cluster based on the data's known and measurable impact to production.

As one example of collecting data, seismic data may be obtained by sending energy into a subsurface volume of interest using surface or subsurface sources and receiving the signal reflected off of a subsurface feature at surface or subsurface receivers. Zero-offset surface source-receiver pairs may send energy waves into the subsurface volume of interest. Energy waves may reflect or refract off the subsurface feature. Source-receiver pairs may receive the reflected and refracted energy waves which may be processed and converted into seismic data. In some implementations, a surface or subsurface source may send subsurface energy into the subsurface, which may then be reflected and/or refracted by the subsurface features and may be recorded at the surface or subsurface receivers at various distances away from the source. Subsurface energy may include acoustic compressional or shear waves. For example, the surface or subsurface source may generate acoustic compressional or shear waves and direct them towards a subsurface region that includes various lithologies (e.g., underground rock structures). The seismic data may be generated from subsurface signals (e.g., the reflections of the subsurface energy off of the various subsurface lithologies) and received by sensors, such as geophones and/or other acoustic detectors. The seismic data may be stored in a non-transitory storage medium and/or another source.

Referring back to spatial clustering model component 108, training the initial spatial clustering model may include applying the initial spatial clustering model to the training data to generate a first iteration of type curve regions. The initial spatial clustering model may be adjusted to more accurately estimate the type curve regions based on at least the corresponding accuracy values for the type curve regions. For example, adjustable hyperparameters may be adjusted after individual iterations of the initial spatial clustering model. This is repeated numerous times until the initial spatial clustering model is "trained," i.e., it is able to output type curve regions that are consistently within a threshold of the accuracy value. In some implementations, the threshold value may account for the speed of the spatial clustering model, resources used by the spatial clustering model, and/or other optimization metrics. This threshold may be based on at least an average of values, a minimum of values, a maximum of values, and/or other parameters.

Other metrics may be applied to determine that the spatial clustering model is "conditioned" or "trained." As an example, the threshold may be with 5% of the accuracy value, though it should be appreciated that the threshold may be 10%, 15%, 25%, and so on.

In some implementations, the production parameter data may be used to guide the iterations. For example, productivity values may impact a given type curve region as a whole (e.g., impacting all of the boundaries of the given type curve region, impacting one entire boundary of the given type curve region, impacting the overall polygonal shape of the given type curve region, and the like), and the other production parameter values may impact individual portions of a boundary for the given type curve region (e.g., impacting a localized portion of one boundary of the given type curve region).

In implementations, training the initial spatial clustering model may include generating synthetic seismic data, well data, and/or other data from existing assets. Training may also include deriving training data from existing assets. Training may also include validating the trained model by using testing data. The testing data may be well data, production parameter data, subsurface data, and/or other data that is not a part of the training data. Training may also include applying the spatial clustering model to the testing data to generate type curve regions. Training may also include determining accuracy values for the type curve regions.

The spatial clustering model may be able to predict type curve regions by recognizing patterns in the training data. In implementations, the various input data, including, for example, any adjustable hyperparameters, may be weighted differently. As another example, different types of well data and/or production parameter data may be weighted differently.

In some implementations, the spatial clustering model may use spatial K-means clustering, triangulation methods, and/or other models. The spatial clustering model may also use a random seed and automatically adjust the geographic extents based on at least the region of interest. The spatial clustering model may iterate to find a number of type curve regions based on at least a method of analysis of variance. For example, one method of analysis of variance may include a ratio between a mean productivity variation between areas in the region of interest and a productivity variation within one of the areas in the region of interest. Different spatial clustering models may use different criteria to determine an appropriate number of type curve regions and process by which they are delineated. The spatial clustering models all may delineate similar values based on some tolerance for variation within a nearby region.

In some implementations, the spatial clustering model may use a number of type curve regions, continuous well data, and model analysis, including, for example, f-statistics, to delineate the type curve regions.

In implementations, the type curve regions may be further refined to maximize an accuracy value. The accuracy value may be based on at least (1) a precision value, which itself quantifies a number of correct positive results made (e.g., a number of true positive predictions divided by the number of all positive predictions) and (2) a recall value, which itself quantifies a number of correct positive results made out of all positive results that could have been made (e.g., a number of true positive predictions divided by the number of all predictions that should have been identified as positive). The accuracy value may range from 0 to 1 and maximizing the accuracy value may mean adjusting variables to increase the accuracy value toward 1.

In implementations, spatial clustering model component 108 may be configured to generate a spatial clustering model. In some implementations, this may be accomplished by training an initial spatial clustering model, as discussed above.

Well data component 110 may be configured to obtain well data. The well data may be obtained from the non-transitory storage medium and/or other sources. The well data may include well locations in the region of interest and corresponding productivity for the well locations. Well locations may include geographical coordinates, x-y coordinates, and/or other location information. The productivity may characterize the amount of hydrocarbons that can be extracted from a well. The well data may include spatially continuous data, spatially discrete data, and/or other types of data. Spatially discrete data may be data at given points in the region of interest, such as, for example, from wells. Well data may include fracture data, petrophysical data, wireline logs, mud logs, completion design, well spacing, wellbore tortuosity, production data, breakdown pressure data, and/or other data. For example, other data may include core, petrophysical data and wireline logs, image logs, mud logs, completion design, well spacing, wellbore tortuosity, production logs. In some implementations, well data may include completion data and production data. Completion data may include well perforation lengths, proppant intensity, fluid types, well spacing, number of fracturing stages, and/or other completion data. Production data may include cumulative oil, gas, and/or water production at different time intervals, such as, for example, 6 month, 12 month, 18 month, and so on, cumulative standard barrels of oil equivalent produced. In implementations, the well data may be derived from historical production wells. The historical production data may be used as input for a model that can predict production data.

For example, a parameter model may be trained using training data on an initial parameter model. The training data may include well data and the production parameter values for corresponding multiple production parameters affecting productivity of the one or more wells as a function of position in the subsurface volume of interest. The parameter model may include random forest machine learning and/or other machine learning.

As an example, the parameter model may include random forest machine learning. Random forest machine learning may have a low risk of overfitting, may allow extreme randomization, and may be very iterative. Random forest may be a modification of bootstrap aggregation that builds on a large collection of de-correlated regression trees and then averages them. Bootstrap aggregation may average many noisy but unbiased models to reduce prediction variance. Regression trees may be appropriate for bootstrap aggregation, because they can capture complex interaction structure. The random forest machine learning may use many boot strap sets and many regression trees to generate many predictions, ultimately averaged together to provide the final prediction algorithm. This identifies the most impactful and statistically significant predictor production parameters that account for differences in well production. Applying the parameter model to the multiple refined production parameter maps may allow for validation of the analytic model via blind testing. Production parameter maps or reservoir property maps may include, at a minimum, average porosity, pore saturation, mineralogy, lithofacies, geomechanical properties, organic richness, and/or any other reservoir property. It should be appreciated that the production parameters or reservoir properties may include any combination of elements (e.g., only average porosity, only pore saturation, only mineralogy, etc.; only average porosity and pore saturation, only pore saturation and mineralogy, etc.; only average porosity, pore saturation, and mineralogy, etc.; only pore saturation, mineralogy, and lithofacies, etc.; and so on).

The parameter model may be applied to multiple production parameter maps to generate multiple refined production parameters including refined production parameter values. The production parameter maps may be generated using the subsurface data and the well data. A given production parameter map may represent the production parameter values for a given production parameter as a function of time and position in the subsurface volume of interest. In some implementations, production parameter values may be filtered based on statistical significance and/or collinearity using, for example, a Pearson correlation matrix.

The refined production parameters may be a subset of the multiple production parameters. The parameter model may have been trained, as described herein, to identify one or more of the multiple production parameters that have the greatest effect on productivity compared to the other multiple production parameters. In implementations, a Boruta plot may be generated from the random forest model using the refined production parameters and corresponding refined production parameter values.

Multiple refined production parameter graphs may be generated from the refined production parameter values. A given refined production parameter graph may specify the refined production parameter values for a corresponding production parameter as a function of estimated reservoir productivity.

The multiple refined production parameter graphs may be displayed. The multiple refined production parameter graphs may be displayed on a graphical user interface and/or other displays. In implementations, trends, thresholds, and/or other conditions may be determined or identified to limit the refined production parameter values using linear analysis, non-linear analysis, rate of change analysis, machine learning, and/or other techniques.

In some implementations, one or more user input options may be generated to limit the refined production parameter values corresponding to individual ones of the multiple refined production parameters. By way of non-limiting example, user input options may include a window input for text, numbers, and/or symbols; options to select greater than, greater than or equal to, less than, and/or less than or equal to; note a trend of increasing values, a trend of decreasing values; note a linear trend, a non-linear trend, and/or other trends, options to select one or more threshold values; and/or other trends. In implementations, user input options may include defining a well design or completion design. A well design may include design parameters used to extract hydrocarbons from a reservoir. The design parameters may include, for example, proppant intensity, fluid intensity, lateral spacing, and/or other design parameters.

The one or more user input options corresponding to the multiple refined production parameters may be presented to a user. The one or more user input options may be displayed on a graphical user interface and/or other displays.

A defined well design and the one or more user input options selected by a user may be received to limit the refined production parameter values corresponding to the multiple refined production parameter graphs to generate limited production parameter values. The defined well design may describe the design parameters for extracting hydrocarbons, as described above. The limited production parameter values may be a subset of the refined production parameter values. As described herein, the limited production parameter values may be limited based on the thresholds and/or trends of the multiple refined production parameter graphs identified by the system or by a user through the user input options. The parameter model may be used to generate a spatial array of the subsurface volume of interest. The size of the spatial array may have various spacings and/or resolutions for each data point. It should be appreciated that there are no inherent limitations to the spacing of the array, nor the temporal resolution of the cumulative production predictions tied to each array location. The spatial array may include coordinates, production parameter values, a defined well design, cumulative estimated reservoir productivity in multiple time intervals, and/or other items.

Referring back to FIG. 1, production parameter data component 112 may be configured to obtain production parameter data. The production parameters may include, at a minimum, average porosity, pore saturation, mineralogy, lithofacies, geomechanical properties, organic richness, pore pressure, quartz normalized, volume water, argillic bed count, bed thickness, gross thickness, gross perforation length, fracture fluid intensity, proppant intensity, productivity, and/or any other production parameter affecting the productivity of a subsurface volume of interest. As described, there are additional examples of production parameters and how they may be used and generated. As noted above, it should be appreciated that the production parameters may include any combination of reservoir properties (e.g., only average porosity, only pore saturation, only mineralogy, etc.; only average porosity and pore saturation, only pore saturation and mineralogy, etc.; only average porosity, pore saturation, and mineralogy, only pore saturation, mineralogy, and lithofacies, etc.; and so on).

Type curve region component 114 may be configured to delineate each of the type curve regions in the region of interest. This may be accomplished by the one or more physical computer processors. The type curve regions may be delineated by applying the spatial clustering model to the well data and the production parameter data. Among other things, the spatial clustering model generates polygons to surround the type curve regions. The type curve regions may be delineated based on at least differences in different types of productivity values. Each type curve region may include areas that have minimal productivity variation within the given type curve region with respect to P10-P90 values, while having a larger distinction in mean production values as compared to other type curve regions in the region of interest. The different types of productivity values may include mean productivity values, P10-P90 values, and/or other productivity values.

Representation component 116 may be configured to generate a representation of the type curve regions as a function of position in the region of interest using visual effects to depict geographic boundaries outlining at least some of the type curve regions delineated using the spatial clustering model. In some implementations, a visual effect may include a visual transformation of the representation. A visual transformation may include a visual change in how the representation is presented or displayed. In some implementations, a visual transformation may include a visual zoom, a visual filter, a visual rotation, and/or a visual overlay (e.g., text and/or graphics overlay). The visual effect may include using a temperature map, or other color coding, to indicate which positions in the subsurface volume of interest have higher or lower values.

Representation component 116 may be configured to display the one or more representations. The one or more representations may be displayed on a graphical user interface and/or other displays.

In some implementations, server(s) 102, client computing platform(s) 104, and/or external resources 130 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 130 may be operatively linked via some other communication media.

A given client computing platform 104 may include one or more processors configured to execute computer program components. The computer program components may be configured to enable an expert or user associated with the given client computing platform 104 to interface with system 100 and/or external resources 130, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 130 may include sources of information outside of system 100, external entities participating with system 100, and/or other resources. In some implementations, some or all of the functionality attributed herein to external resources 130 may be provided by resources included in system 100.

Server(s) 102 may include electronic storage 132, one or more processors 134, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 132 may comprise non-transitory storage medium and/or non-transitory storage media that electronically stores information. The electronic storage media of electronic storage 132 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 132 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 132 may include one or more virtual storage resources (e.g., cloud storage, a virtual private network, and/or other virtual storage resources). Electronic storage 132 may store software algorithms, information determined by processor(s) 134, information received from server(s) 102, information received from client computing platform(s) 104, and/or other information that enables server(s) 102 to function as described herein.

Processor(s) 134 may be configured to provide information processing capabilities in server(s) 102. As such, processor(s) 134 may include one or more of a physical computer processor, a digital processor, an analog processor, a digital circuit designed to process information, an analog circuit designed to process information, a state machine, and/or other mechanisms for electronically processing information. Although processor(s) 134 is shown in FIG. 1 as a single entity, this is for illustrative purposes only. In some implementations, processor(s) 134 may include a plurality of processing units. These processing units may be physically located within the same device, or processor(s) 134 may represent processing functionality of a plurality of devices operating in coordination. Processor(s) 134 may be configured to execute components 108, 110, 112, 114, and/or 116, and/or other components. Processor(s) 134 may be configured to execute components 108, 110, 112, 114, and/or 116, and/or other components by software; hardware; firmware; some combination of software, hardware, and/or firmware; and/or other mechanisms for configuring processing capabilities on processor(s) 134. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, and/or 116 are illustrated in FIG. 1 as being implemented within a single processing unit, in implementations in which processor(s) 134 includes multiple processing units, one or more of components 108, 110, 112, 114, and/or 116 may be implemented remotely from the other components. The description of the functionality provided by the different components 108, 110, 112, 114, and/or 116 described below is for illustrative purposes, and is not intended to be limiting, as any of components 108, 110, 112, 114, and/or 116 may provide more or less functionality than is described. For example, one or more of components 108, 110, 112, 114, and/or 116 may be eliminated, and some or all of its functionality may be provided by other ones of components 108, 110, 112, 114, and/or 116. As an example, processor(s) 134 may be configured to execute one or more additional components that may perform some or all of the functionality attributed below to one of components 108, 110, 112, 114, and/or 116.

Figure 2:
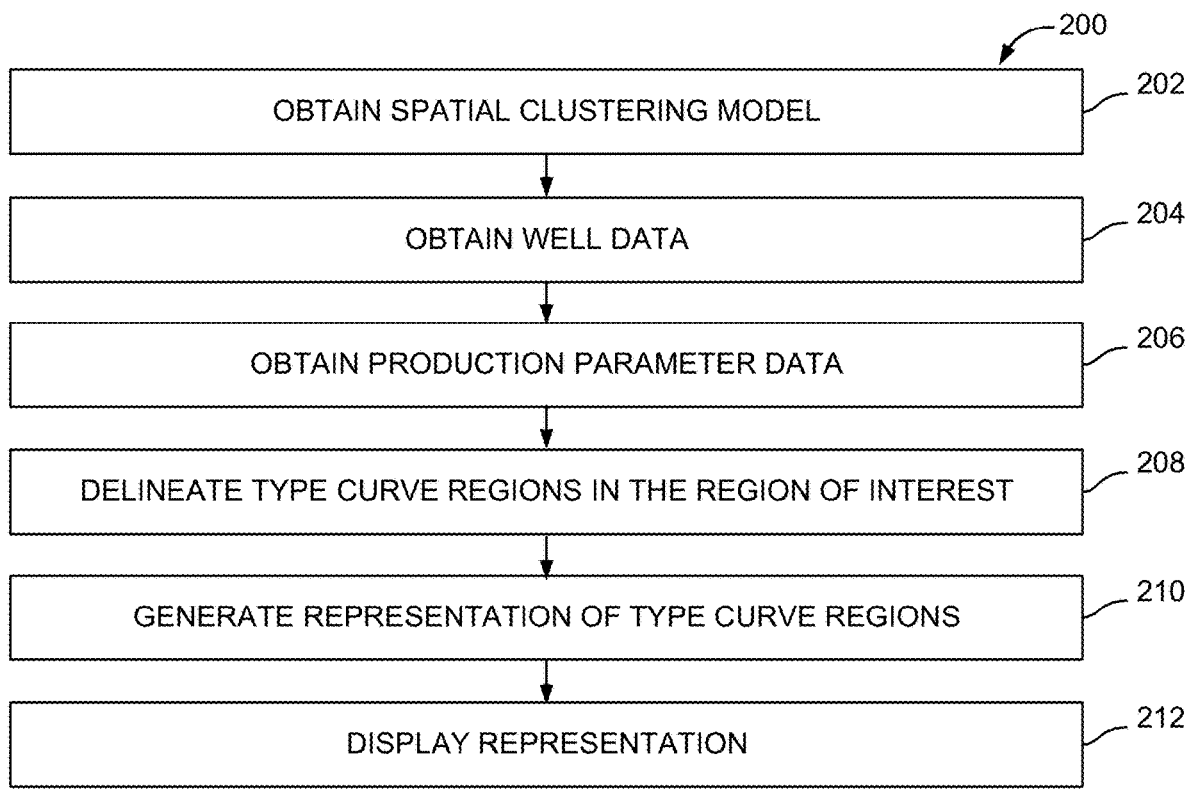
FIG. 2 illustrates a method for identifying type curve regions as a function of position in a region of interest, in accordance with one or more implementations.

FIG. 2 illustrates a method for identifying type curve regions as a function of position in a region of interest, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a physical computer processor, a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

Operation 202 may include obtaining a spatial clustering model. The spatial clustering model may be based on at least a ratio between a mean productivity variation between areas in the region of interest and a productivity variation within one of the areas in the region of interest. The spatial clustering model may include a machine learning model, spatial k-means clustering, triangulation, and/or other models. In some implementations, the spatial clustering model may have been trained, as described above. The spatial clustering model may have been conditioned, or trained, by training an initial spatial clustering model using training data. The training data may include well data, production parameter data, subsurface data, and/or other data. The machine learning model may be an unsupervised machine learning model that includes adjustable hyperparameters. The adjustable hyperparameters may include reservoir original oil in place, porosity, geomechanics, pressure, temperature, position, reservoir thickness, number of type curve regions, and/or other adjustable hyperparameters. As noted above, it should be appreciated that the adjustable hyperparameters may include any combination of adjustable hyperparameters (e.g., only reservoir original oil in place, only porosity, etc.; reservoir original oil in place and porosity; reservoir original oil in place, porosity, and geomechanics; reservoir original oil in place, porosity, geomechanics, and pressure; and so on). Operation 202 may be performed by a physical computer processor configured by machine-readable instructions including a component that is the same as or similar to spatial clustering model component 108 in accordance with one or more implementations.

Operation 204 may include obtaining well data. The well data may include well locations in the region of interest and corresponding productivity for the well locations. Well locations may include geographical coordinates, x-y coordinates, and/or other location information. The productivity may characterize the amount of hydrocarbons that can be extracted from a well. The well data may include spatially continuous data, spatially discrete data, and/or other types of data. Well data may include fracture data, petrophysical data, wireline logs, mud logs, completion design, well spacing, wellbore tortuosity, production data, breakdown pressure data, and/or other data. For example, other data may include core, petrophysical data and wireline logs, image logs, mud logs, completion design, well spacing, wellbore tortuosity, production logs. In some implementations, well data may include completion data and production data, as described above. Operation 204 may be performed by a physical computer processor configured by machine-readable instructions including a component that is the same as or similar to well data component 110 in accordance with one or more implementations.

Operation 206 may include obtaining production parameter data. The production parameter data may include production parameter values characterizing subsurface production features that affect reservoir productivity in the region of interest. As described above, the production parameters may include, at a minimum, average porosity, pore saturation, mineralogy, lithofacies, geomechanical properties, organic richness, pore pressure, quartz normalized, volume water, argillic bed count, bed thickness, gross thickness, gross perforation length, fracture fluid intensity, proppant intensity, productivity, and/or any other production parameter affecting the productivity of a subsurface volume of interest. It should be appreciated that the production parameters may include any combination of reservoir properties (e.g., only average porosity, only pore saturation, only mineralogy, etc.; only average porosity and pore saturation, only pore saturation and mineralogy, etc.; only average porosity, pore saturation, and mineralogy, only pore saturation, mineralogy, and lithofacies, etc.; and so on). By way of non-limiting example, the subsurface production features may include one or more petrophysical, core, cutting, pressure, drilling property, mudlog, seismic features, well perforation lengths, proppant intensity, fluid types, well spacing, number of fracturing stages, cumulative oil production over a time interval, cumulative gas production over a time interval, cumulative water production over a time interval, well attributes, and/or other features. Similar to the above reservoir properties, it should be appreciated that the subsurface production features may include any combination of reservoir properties (e.g., only petrophysical, only core, only cutting, etc.; only petrophysical and core, only core and cutting, etc.; only petrophysical, core, and cutting, only core, cutting, and pressure, etc.; and so on). Operation 206 may be performed by a physical computer processor configured by machine-readable instructions including a component that is the same as or similar to spatial production parameter data component 112 in accordance with one or more implementations.

Operation 208 may include delineating type curve regions in the region of interest. Delineating each of the type curve regions in the region of interest may be based on at least differences in different types of productivity values. Operation 208 may be performed by a physical computer processor configured by machine-readable instructions including a component that is the same as or similar to type curve region component 114, in accordance with one or more implementations.

Operation 210 may include generating a representation of type curve regions as a function of position in the region of interest. The representation may use visual effects to depict geographic boundaries outlining at least some of the type curve regions delineated using the spatial clustering model. Operation 210 may be performed by a physical computer processor configured by machine-readable instructions including a component that is the same as or similar to representation component 116, in accordance with one or more implementations.

Operation 212 may include displaying the representation. Operation 212 may be performed by a physical computer processor configured by machine-readable instructions including a component that is the same as or similar to representation component 116, in accordance with one or more implementations.

Figure 3:
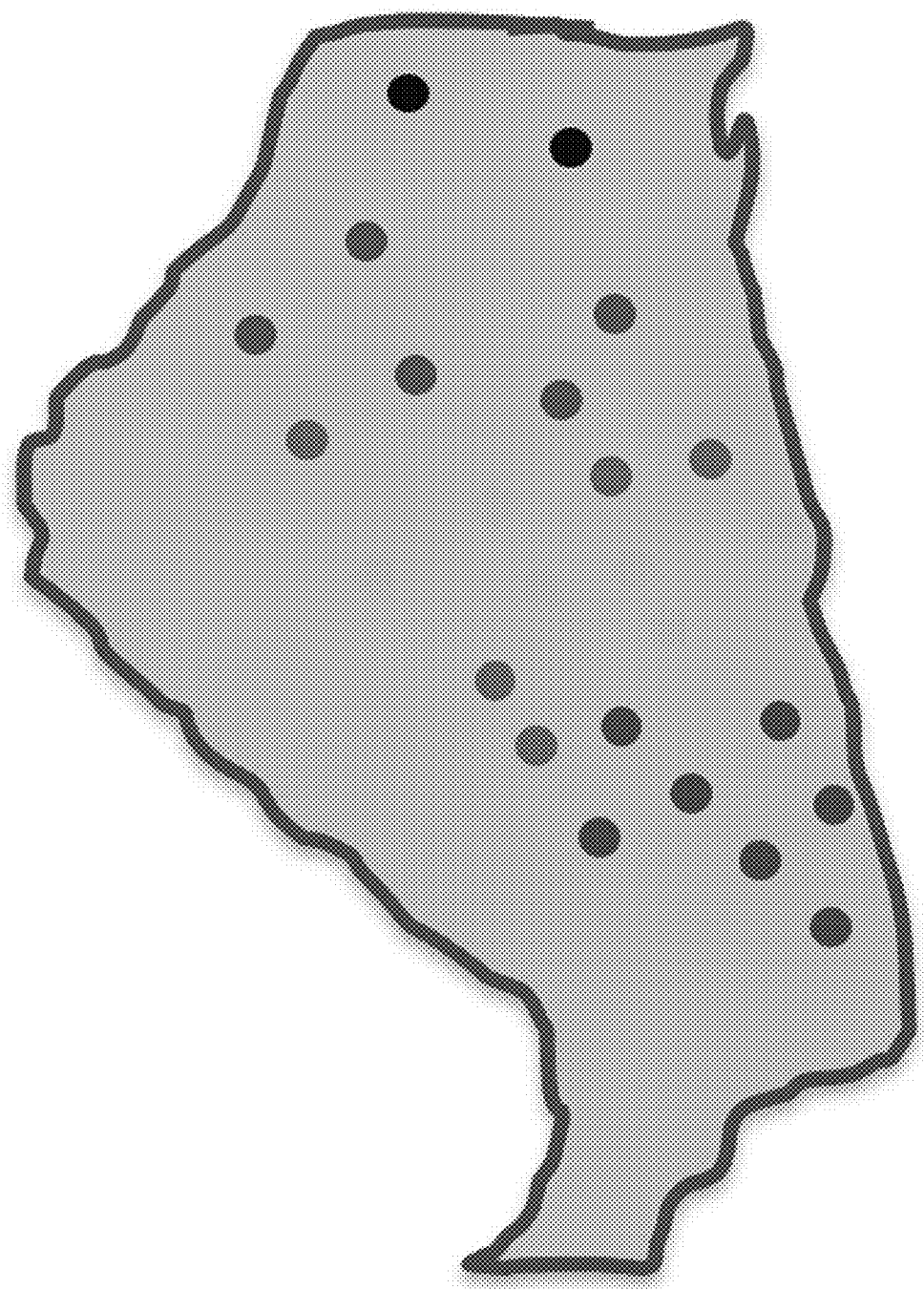
FIG. 3 illustrates multiple wells a function of position in the region of interest, in accordance with one or more implementations.

FIG. 3 illustrates multiple wells as a function of position in the region of interest, in accordance with one or more implementations. The circles in the region of interest represent wells.

Figure 4:
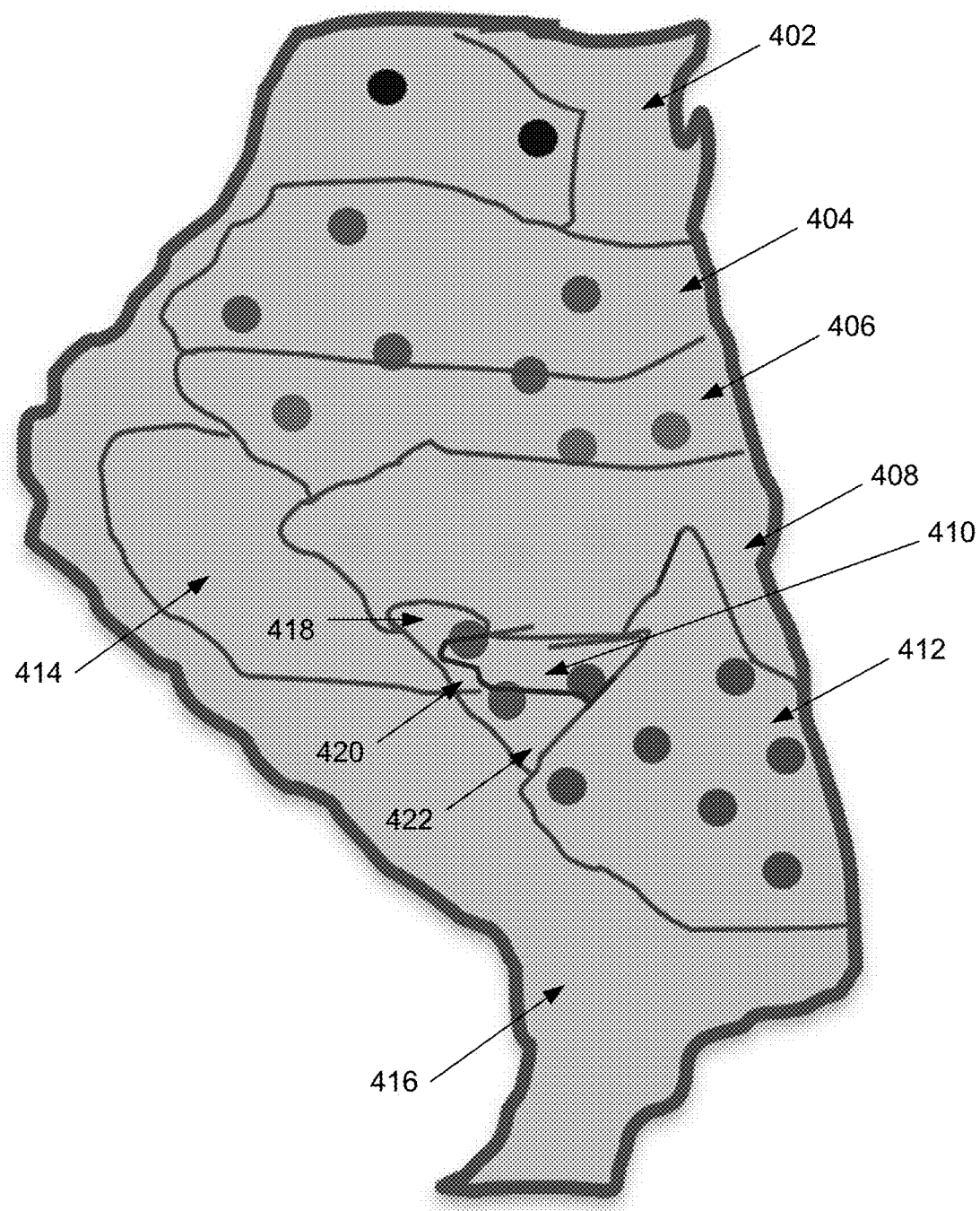
FIG. 4 illustrates type curve regions as a function of position in a region of interest using existing methods, in accordance with one or more implementations.

FIG. 4 illustrates type curve regions as a function of position in a region of interest using existing methods, in accordance with one or more implementations. The 11 type curve regions 402, 404, 406, 408, 410, 412, 414, 416, 418, 420, and 422 in the region of interest may be determined based on existing methods. As noted above, these existing methods do not account for normalizing production to engineering designs, nor do they mitigate the effect of clustering on well development, among other issues. Moreover, the subjective methods used to draw these types of type curve regions illustrated fail to account for reservoir properties for production or match the continuous, gradation reservoir changes to distinct polygonal type curve regions. In addition, the existing methods do not test the statistical significance of regions against each other or fully appreciate when type curve regions should be subdivided or agglomerated. Nor do they make connections between production clustering and reservoir driver clustering.

Figure 5:
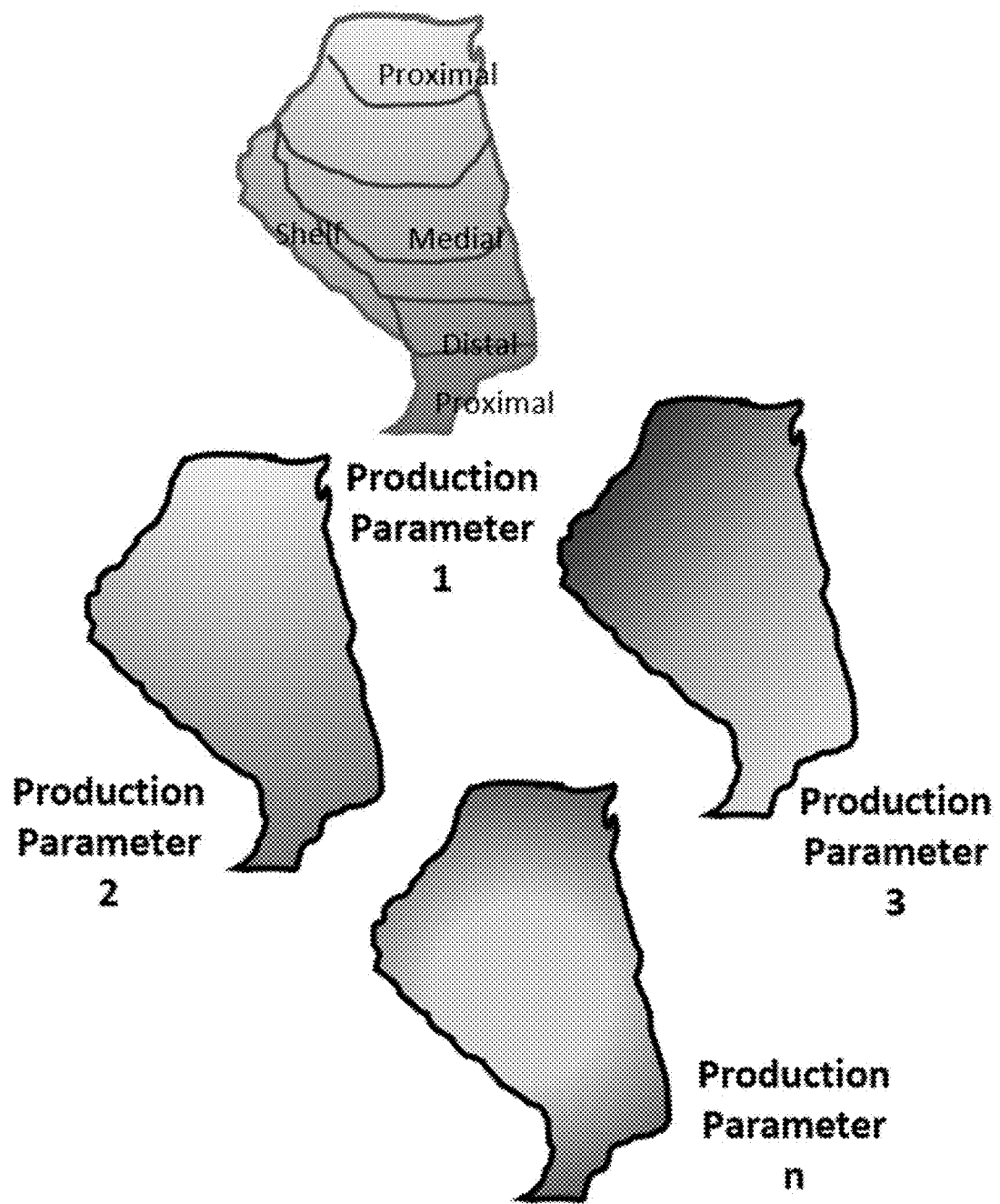
FIG. 5 illustrates various production parameter values as a function of position in the region of interest, in accordance with some implementations.

FIG. 5 illustrates various production parameter values as a function of position in the region of interest, in accordance with some implementations. Example production parameter values are shown as a function of position in the region of interest. As noted above, these production parameters may include, for example, average porosity, pore saturation, mineralogy, lithofacies, geomechanical properties, organic richness, pore pressure, quartz normalized, volume water, argillic bed count, bed thickness, gross thickness, gross perforation length, fracture fluid intensity, proppant intensity, productivity, and/or any other production parameter affecting the productivity of a subsurface volume of interest. It should still be appreciated that the production parameters may include any combination of production parameters (e.g., only average porosity, only pore saturation, only mineralogy, etc.; only average porosity and pore saturation, only pore saturation and mineralogy, etc.; only average porosity, pore saturation, and mineralogy, only pore saturation, mineralogy, and lithofacies, etc.; and so on).

Figure 6:
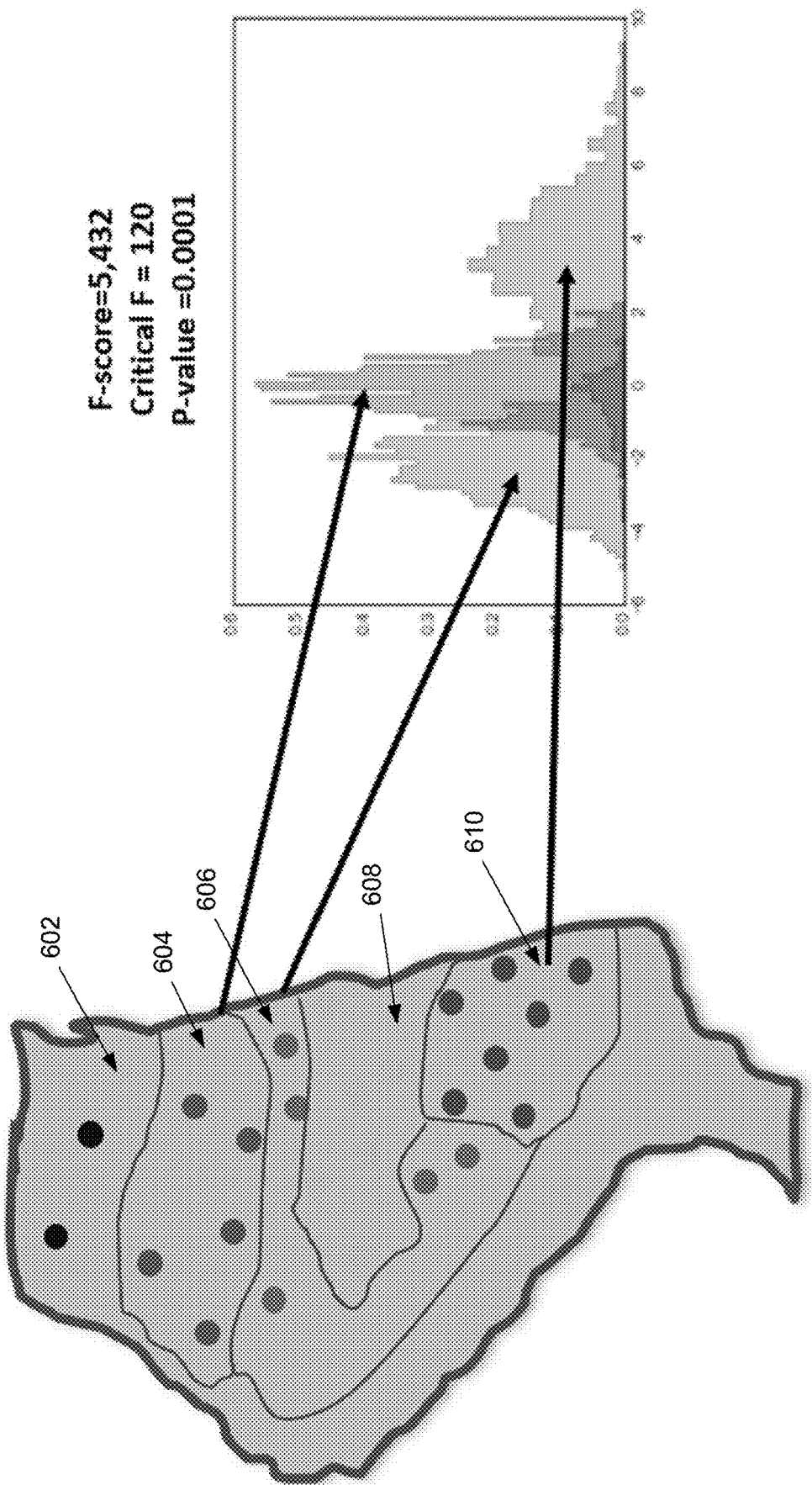
FIG. 6 illustrates type curve regions as a function of position in a region of interest using the presently disclosed technology, in accordance with one or more implementations.

FIG. 6 illustrates type curve regions as a function of position in a region of interest using the presently disclosed technology, in accordance with one or more implementations. The five type curve regions 602, 604, 606, 608, and 610 illustrate the results of the presently disclosed technology. FIG. 6 highlights the benefits of the presently disclosed technology, namely, that it is able to mitigate outliers, uses objective data, such as engineering and reservoir predictors to forecast production, samples from within regions to test for statistical significance and distinctiveness, and informs on the subdivision of the type curve regions based on cluster analysis. Moreover, as compared to FIG. 4, (1) there are fewer type curve regions, (2) each type curve region, as compared to the type curve regions of FIG. 4, has more distinct mean production values from the other type curve regions using the presently disclosed technology, and (3) each type curve region has a lower variation in P10-P90 values than the type curve regions of FIG. 4.

Figure 7:
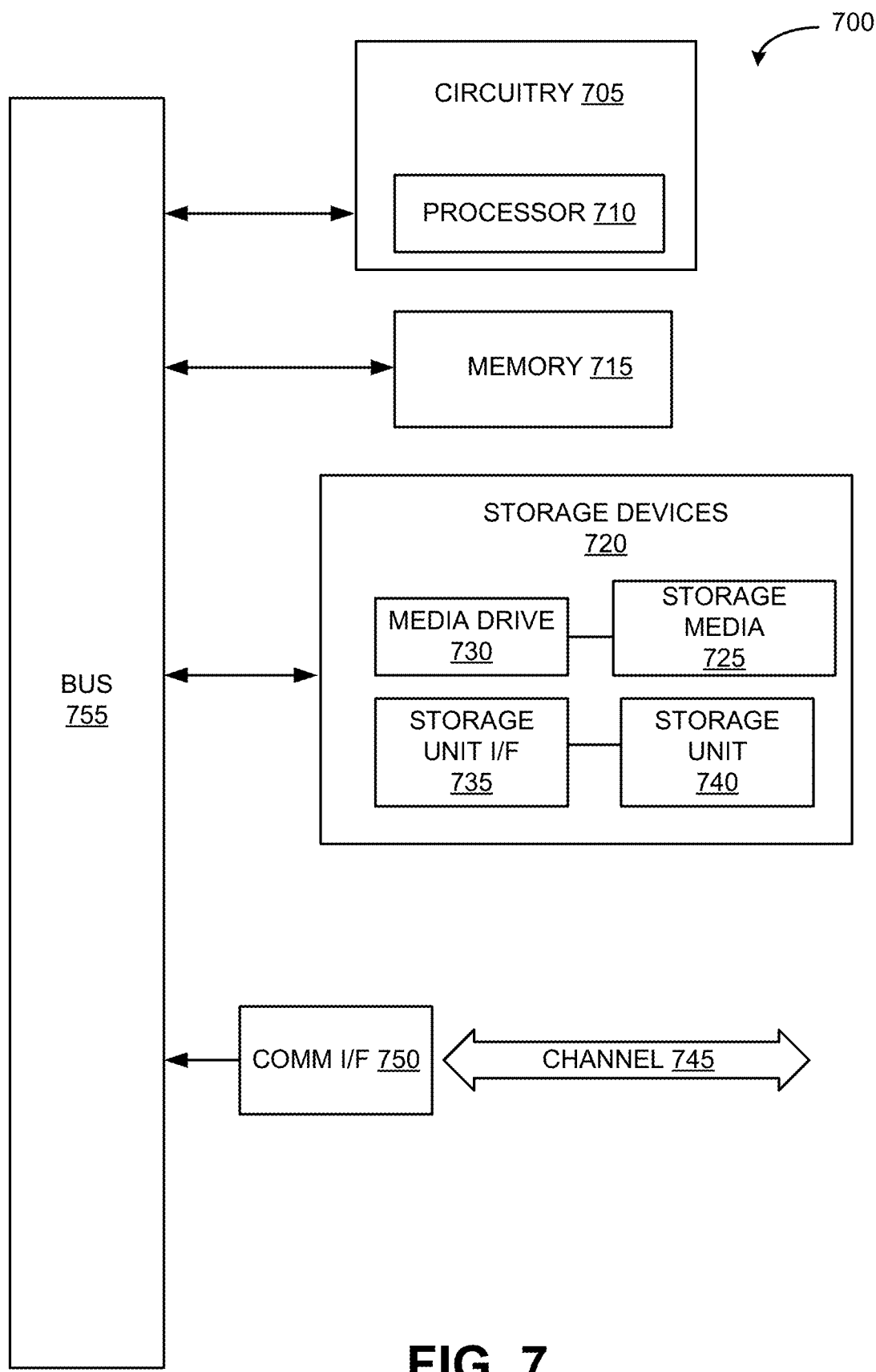
FIG. 7 illustrates example computing component, in accordance with some implementations.

FIG. 7 illustrates example computing component 700, which may in some instances include a processor/controller resident on a computer system (e.g., server system 106). Computing component 700 may be used to implement various features and/or functionality of implementations of the systems, devices, and methods disclosed herein. With regard to the above-described implementations set forth herein in the context of systems, devices, and methods described with reference to FIGS. 1 through 6, including implementations involving server(s) 102, it may be appreciated additional variations and details regarding the functionality of these implementations that may be carried out by computing component 700. In this connection, it will also be appreciated upon studying the present disclosure that features and aspects of the various implementations (e.g., systems) described herein may be implemented with respect to other implementations (e.g., methods) described herein without departing from the spirit of the disclosure.

As used herein, the term component may describe a given unit of functionality that may be performed in accordance with some implementations of the present application. As used herein, a component may be implemented utilizing any form of hardware, software, or a combination thereof. For example, a processor, controller, ASIC, PLA, PAL, CPLD, FPGA, logical component, software routine, or other mechanism may be implemented to make up a component. In implementation, the various components described herein may be implemented as discrete components or the functions and features described may be shared in part or in total among components. In other words, it should be appreciated that after reading this description, the various features and functionality described herein may be implemented in any given application and may be implemented in separate or shared components in various combinations and permutations. Even though various features or elements of functionality may be individually described or claimed as separate components, it will be appreciated that upon studying the present disclosure that these features and functionality may be shared among a common software and hardware element, and such description shall not require or imply that separate hardware or software components are used to implement such features or functionality.

Where components of the application are implemented in whole or in part using software, in implementations, these software elements may be implemented to operate with a computing or processing component capable of carrying out the functionality described with respect thereto. One such example computing component is shown in FIG. 7. Various implementations are described in terms of example computing component 700. After reading this description, it will be appreciated how to implement example configurations described herein using other computing components or architectures.

Referring now to FIG. 7, computing component 700 may represent, for example, computing or processing capabilities found within mainframes, supercomputers, workstations or servers; desktop, laptop, notebook, or tablet computers; hand-held computing devices (tablets, PDA's, smartphones, cell phones, palmtops, etc.); or the like, depending on the application and/or environment for which computing component 700 is specifically purposed.

Computing component 700 may include, for example, a processor, controller, control component, or other processing device, such as a processor 710, and such as may be included in circuitry 705. Processor 710 may be implemented using a special-purpose processing engine such as, for example, a microprocessor, controller, or other control logic. In the illustrated example, processor 710 is connected to bus 755 by way of circuitry 705, although any communication medium may be used to facilitate interaction with other components of computing component 700 or to communicate externally.

Computing component 700 may also include a memory component, simply referred to herein as main memory 715. For example, random access memory (RAM) or other dynamic memory may be used for storing information and instructions to be executed by processor 710 or circuitry 705. Main memory 715 may also be used for storing temporary variables or other intermediate information during execution of instructions to be executed by processor 710 or circuitry 705. Computing component 700 may likewise include a read only memory (ROM) or other static storage device coupled to bus 755 for storing static information and instructions for processor 710 or circuitry 705.

Computing component 700 may also include various forms of information storage devices 720, which may include, for example, media drive 730 and storage unit interface 735. Media drive 730 may include a drive or other mechanism to support fixed or removable storage media 725. For example, a hard disk drive, a floppy disk drive, a magnetic tape drive, an optical disk drive, a CD or DVD drive (R or RW), or other removable or fixed media drive may be provided. Accordingly, removable storage media 725 may include, for example, a hard disk, a floppy disk, magnetic tape, cartridge, optical disk, a CD or DVD, or other fixed or removable medium that is read by, written to, or accessed by media drive 730. As these examples illustrate, removable storage media 725 may include a computer usable storage medium having stored therein computer software or data.

In alternative implementations, information storage devices 720 may include other similar instrumentalities for allowing computer programs or other instructions or data to be loaded into computing component 700. Such instrumentalities may include, for example, fixed or removable storage unit 740 and storage unit interface 735. Examples of such removable storage units 740 and storage unit interfaces 735 may include a program cartridge and cartridge interface, a removable memory (for example, a flash memory or other removable memory component) and memory slot, a PCMCIA slot and card, and other fixed or removable storage units 740 and storage unit interfaces 735 that allow software and data to be transferred from removable storage unit 740 to computing component 700.

Computing component 700 may also include a communications interface 750. Communications interface 750 may be used to allow software and data to be transferred between computing component 700 and external devices. Examples of communications interface 750 include a modem or softmodem, a network interface (such as an Ethernet, network interface card, WiMedia, IEEE 702.XX, or other interface), a communications port (such as for example, a USB port, IR port, RS232 port Bluetooth® interface, or other port), or other communications interface. Software and data transferred via communications interface 750 may typically be carried on signals, which may be electronic, electromagnetic (which includes optical) or other signals capable of being exchanged by a given communications interface 750. These signals may be provided to/from communications interface 750 via channel 745. Channel 745 may carry signals and may be implemented using a wired or wireless communication medium. Some non-limiting examples of channel 745 include a phone line, a cellular or other radio link, an RF link, an optical link, a network interface, a local or wide area network, and other wired or wireless communications channels.

In this document, the terms "computer program medium" and "computer usable medium" are used to generally refer to transitory or non-transitory media such as, for example, main memory 715, storage unit interface 735, removable storage media 725, and channel 745. These and other various forms of computer program media or computer usable media may be involved in carrying a sequence of instructions to a processing device for execution. Such instructions embodied on the medium, are generally referred to as "computer program code" or a "computer program product" (which may be grouped in the form of computer programs or other groupings). When executed, such instructions may enable the computing component 700 or a processor to perform features or functions of the present application as discussed herein.

Various implementations have been described with reference to specific example features thereof. It will, however, be evident that various modifications and changes may be made thereto without departing from the broader spirit and scope of the various implementations as set forth in the appended claims. The specification and figures are, accordingly, to be regarded in an illustrative rather than a restrictive sense.

Although described above in terms of various example implementations and implementations, it should be understood that the various features, aspects, and functionality described in one of the individual implementations are not limited in their applicability to the particular implementation with which they are described, but instead may be applied, alone or in various combinations, to other implementations of the present application, whether or not such implementations are described and whether or not such features are presented as being a part of a described implementation. Thus, the breadth and scope of the present application should not be limited by any of the above-described example implementations.

Terms and phrases used in the present application, and variations thereof, unless otherwise expressly stated, should be construed as open ended as opposed to limiting. As examples of the foregoing: the term "including" should be read as meaning "including, without limitation," or the like; the term "example" is used to provide illustrative instances of the item in discussion, not an exhaustive or limiting list thereof; the terms "a" or "an" should be read as meaning "at least one," or the like; and adjectives such as "standard," "known," and terms of similar meaning should not be construed as limiting the item described to a given time period or to an item available as of a given time, but instead should be read to encompass standard technologies that may be available or known now or at any time in the future. Likewise, where this document refers to technologies that would be appreciated to one of ordinary skill in the art, such technologies encompass that which would be appreciated by the skilled artisan now or at any time in the future.

The presence of broadening words and phrases such as "at least," "but not limited to," or other like phrases in some instances shall not be read to mean that the narrower case is intended or required in instances where such broadening phrases may be absent. The use of the term "component" does not imply that the components or functionality described or claimed as part of the component are all configured in a common package. Indeed, any or all of the various components of a component, whether control logic or other components, may be combined in a single package or separately maintained and may further be distributed in multiple groupings or packages or across multiple locations.

Additionally, the various implementations set forth herein are described in terms of example block diagrams, flow charts, and other illustrations. As will be appreciated after reading this document, the illustrated implementations and their various alternatives may be implemented without confinement to the illustrated examples. For example, block diagrams and their accompanying description should not be construed as mandating a particular architecture or configuration.

What is claimed is:

1. A computer-implemented method for identifying type curve regions as a function of position in a region of interest, the computer-implemented method being implemented in a computer system that includes a physical computer processor, a non-transitory storage medium, and a display, the computer-implemented method comprising:

obtaining a spatial clustering model from the non-transitory storage medium;

obtaining well data from the non-transitory storage medium, wherein the well data includes well locations in the region of interest and corresponding productivity for the well locations;

obtaining production parameter data from the non-transitory storage medium, wherein the production parameter data includes production parameter values characterizing subsurface production features that affect reservoir productivity in the region of interest;

delineating, with the physical computer processor, each of the type curve regions in the region of interest by applying the spatial clustering model to the well data and the production parameter data, evaluating differences in types of productivity values, and identifying a target type curve region with greater distinction in mean productivity values relative to a neighboring type curve region and minimal variation in productivity values within the target type curve region;

generating, with the physical computer processor, a representation of the type curve regions as the function of the position in the region of interest using visual effects to depict geographic boundaries outlining at least some of the type curve regions delineated using the spatial clustering model; and displaying the representation via the display.

2. The computer-implemented method of claim 1, wherein the spatial clustering model is based on at least a ratio between a mean productivity variation between areas in the region of interest and a productivity variation within one of the areas in the region of interest.

3. The computer-implemented method of claim 1, wherein the spatial clustering model comprises an unsupervised machine learning model, wherein the unsupervised machine learning model comprises adjustable hyperparameters.

4. The computer-implemented method of claim 3, wherein the adjustable hyperparameters comprise a spatial weighting of one of reservoir original oil in place, porosity, geomechanics, pressure, temperature, permeability, mineralogy, stratigraphic beds, depositional facies, diagenic facies, natural fracture intensity, pore saturation, reservoir property, position, reservoir thickness, or a number of the type curve regions" in order to provide appropriate antecedence basis.

5. The computer-implemented method of claim 1, wherein the production parameter data comprise one of average porosity, pore saturation, mineralogy, lithofacies, geomechanical properties, organic richness, pore pressure, quartz normalized, volume water, argillic bed count, bed thickness, gross thickness, gross perforation length, fracture fluid intensity, proppant intensity, permeability, mineralogy, stratigraphic beds, depositional facies, diagenic facies, natural fracture intensity, pore saturation, reservoir property, or productivity.

6. The computer-implemented method of claim 1, wherein the types of productivity values comprise mean productivity values and percentile P10-P90 values" in order to provide appropriate antecedence basis.

7. A system comprising:
non-transitory storage medium;
a display; and
a physical computer processor configured by machine-readable instructions to:
obtain a spatial clustering model from the non-transitory storage medium;
obtain well data from the non-transitory storage medium, wherein the well data includes well locations in a region of interest and corresponding productivity for the well locations;

obtain production parameter data from the non-transitory storage medium, wherein the production parameter data includes production parameter values characterizing subsurface production features that affect reservoir productivity in the region of interest;

delineate, with the physical computer processor, each of the type curve regions in the region of interest by applying the spatial clustering model to the well data and the production parameter data, evaluate differences in types of productivity values, and identify a target type curve region with greater distinction in mean productivity values relative to a neighboring type curve region and minimal variation in productivity values within the target type curve region;

generate, with the physical computer processor, a representation of the type curve regions as the function of the position in the region of interest using visual effects to depict geographic boundaries outlining at least some of the type curve regions delineated using the spatial clustering model; and display the representation via the display.

8. The system of claim 7, wherein the spatial clustering model is based on at least a ratio between a mean productivity variation between areas in the region of interest and a productivity variation within one of the areas in the region of interest.

9. The system of claim 7, wherein the spatial clustering model comprises an unsupervised machine learning model, wherein the unsupervised machine learning model comprises adjustable hyperparameters.

10. The system of claim 9, wherein the adjustable hyperparameters comprise a spatial weighting of one of reservoir original oil in place, porosity, geomechanics, pressure, temperature, permeability, mineralogy, stratigraphic beds, depositional facies, diagenic facies, natural fracture intensity, pore saturation, reservoir property, position, reservoir thickness, or a number of the type curve regions" in order to provide appropriate antecedence basis.

11. The system of claim 7, wherein the production parameter data comprise one of average porosity, pore saturation, mineralogy, lithofacies, geomechanical properties, organic richness, pore pressure, quartz normalized, volume water, argillic bed count, bed thickness, gross thickness, gross perforation length, fracture fluid intensity, proppant intensity, permeability, mineralogy, stratigraphic beds, depositional facies, diagenic facies, natural fracture intensity, pore saturation, reservoir property, or productivity.

12. The system of claim 7, wherein the types of productivity values comprise mean productivity values and percentile P10-P90 values" in order to provide appropriate antecedence basis.

13. A non-transitory computer-readable medium storing instructions for identifying type curve regions as a function of position in a region of interest, the instructions configured to, when executed:

obtain a spatial clustering model from a non-transitory storage medium;

obtain well data from the non-transitory storage medium, wherein the well data includes well locations in the region of interest and corresponding productivity for the well locations;

obtain production parameter data from the non-transitory storage medium, wherein the production parameter data includes production parameter values characterizing subsurface production features that affect reservoir productivity in the region of interest;

delineate, with a physical computer processor, each of the type curve regions in the region of interest by applying the spatial clustering model to the well data and the production parameter data, evaluate differences in types of productivity values, and identify a target type curve region with greater distinction in mean productivity values relative to a neighboring type curve region and minimal variation in productivity values within the target type curve region;

generate, with the physical computer processor, a representation of the type curve regions as the function of the position in the region of interest using visual effects to depict geographic boundaries outlining at least some of the type curve regions delineated using the spatial clustering model; and display the representation via a display.

14. The non-transitory computer-readable medium of claim 13, wherein the spatial clustering model is based on at least a ratio between a mean productivity variation between areas in the region of interest and a productivity variation within one of the areas in the region of interest.

15. The non-transitory computer-readable medium of claim 13, wherein the spatial clustering model comprises an unsupervised machine learning model, wherein the unsupervised machine learning model comprises adjustable hyperparameters.

16. The non-transitory computer-readable medium of claim 15, wherein the adjustable hyperparameters comprise one of reservoir original oil in place, porosity, geomechanics, pressure, temperature, position, reservoir thickness, or a number of the type curve regions.

17. The non-transitory computer-readable medium of claim 13, wherein the production parameter data comprises one of average porosity, pore saturation, mineralogy, lithofacies, geomechanical properties, organic richness, pore pressure, quartz normalized, volume water, argillic bed count, bed thickness, gross thickness, gross perforation length, fracture fluid intensity, proppant intensity, or productivity.

18. The non-transitory computer-readable medium of claim 13, wherein the different types of productivity values comprise mean productivity values and percentile P10-P90 values" in order to provide appropriate antecedence basis.

* * * * *